US012550879B2

(12) United States Patent
Li et al.

(10) Patent No.: US 12,550,879 B2
(45) Date of Patent: Feb. 17, 2026

(54) AUTOMATED ROBOTIC BEDBUG ERADICATION DEVICE FOR MATTRESSES

(71) Applicant: The Hong Kong University of Science and Technology, Hong Kong (CN)

(72) Inventors: Guijun Li, Hong Kong (CN); Yang Xu, Hong Kong (CN); Kong Wai Lee, Hong Kong (CN); Haosong Zhong, Hong Kong (CN); Minseong Kim, Hong Kong (CN); Jing Lin, Hong Kong (CN); Wing Yan Poon, Hong Kong (CN); Qiaoyaxiao Yuan, Hong Kong (CN); Huan Liu, Hong Kong (CN); Yee Him Timothy Chan, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 18/956,036

(22) Filed: Nov. 22, 2024

(65) Prior Publication Data

US 2025/0169487 A1 May 29, 2025

Related U.S. Application Data

(60) Provisional application No. 63/602,437, filed on Nov. 23, 2023.

(51) Int. Cl.
*A01M 1/20* (2006.01)
*B25J 5/00* (2006.01)
*B25J 11/00* (2006.01)

(52) U.S. Cl.
CPC ............ *A01M 1/2094* (2013.01); *B25J 5/007* (2013.01); *B25J 11/0085* (2013.01)

(58) Field of Classification Search
CPC .... B25J 11/0085; B25J 5/007; A01M 1/2094; A47C 21/04
See application file for complete search history.

(56) References Cited

U.S. PATENT DOCUMENTS

| 11,297,819 | B2 * | 4/2022 | Kieffer | ..................... A01M 1/20 |
| 2008/0061252 | A1 * | 3/2008 | Garcia | ..................... A61L 2/10 |
| | | | | 250/504 |

(Continued)

FOREIGN PATENT DOCUMENTS

| CN | 207185718 U | 4/2018 |
| CN | 106075493 B | 6/2019 |

(Continued)

OTHER PUBLICATIONS

Stephen A. Kells. "Nonchemical Control of Bed Bugs," American Entomologist, vol. 52, Issue 2, 2006, 109-110.

*Primary Examiner* — Joshua J Michener
*Assistant Examiner* — Henry Hooper Mudd
(74) *Attorney, Agent, or Firm* — Idea Intellectual Limited; Sam T. Yip

(57) ABSTRACT

An automated dry-heating bedbug eradication device for pest eradication is provided herewith. By the use of a specifically fabricated graphene-coated copper heating film, the dry-heating device of the present invention can readily achieve a temperature that is higher than the well-established temperature of 45° C., which is proven lethal to all life stages of bedbugs, and also effective in ant eradication. The device is carefully designed to achieve high portability and maneuverability, and is customizable to accommodate the needs to sanitize mattresses of different sizes in different settings, ranging from home use to commercial hotel or hostel uses. The device of the present invention is also equipped with wireless connectability to mobile applica- (Continued)

tions, and infrared sensor and PID systems for remote real-time monitoring and control.

10 Claims, 9 Drawing Sheets

(56) References Cited

U.S. PATENT DOCUMENTS

| | | | | |
|---|---|---|---|---|
| 2014/0053364 | A1* | 2/2014 | Vasudeva | A01M 7/00 |
| 2020/0075972 | A1* | 3/2020 | Jorgenson | H01M 8/04089 |
| 2021/0195885 | A1* | 7/2021 | Szozda | A01M 3/00 |
| 2025/0318704 | A1* | 10/2025 | Karren | A47L 11/40 |

FOREIGN PATENT DOCUMENTS

| | | |
|---|---|---|
| CN | 113017332 B | 11/2022 |
| CN | 113826596 B | 2/2023 |
| WO | 2023037649 A1 | 3/2023 |

\* cited by examiner

At 60°C

AUTOMATED ROBOTIC BEDBUG ERADICATION DEVICE FOR MATTRESSES

CROSS-REFERENCE TO RELEVANT APPLICATIONS

The present application claims priority from a U.S. provisional patent application Ser. No. 63/602,437 filed Nov. 23, 2023, and the disclosure of which are incorporated by reference in their entirety.

TECHNICAL FIELD

The present invention relates to bedbug eradication on mattresses. More specifically, an automated dry-heating bedbug eradication device for bedbug and pest eradication is provided herewith.

BACKGROUND

*Cimex lectularius*, also widely known as bedbugs, are small, reddish-brown, wingless and nocturnal insects that are parasitic and feed on animal and human blood.

Their small body size of approximately 4-7 mm in length and oval, flattened body shape facilitate their infestation in indoor environments through hiding in cracks, crevices and furniture, particularly in bedding and mattresses seams which provides ideal hiding and resting place in close proximity to their food source.

Despite the fact that they do not transmit diseases, they are typically known to cause skin irritation with their bites, forming itching rashes or blisters. In rarer but more severe occasions, bedbug bites may cause allergic reactions, anaphylaxis or even skin necrosis. As a secondary effect, if infestation is serious or prolonged, the itch caused by bedbug bites may also cause sleep difficulties and associated issues including anxiety and stress.

Coupled by their ability to rapidly reproduce and high resilience, bedbugs have been a persistent issue worldwide. The global resurgence of bedbug infestation around the globe, in particular the high-profile bedbug outbreak in Paris in 2023, has raised worldwide attention in combatting bedbug infestation. With the lifting of travel bans due to the COVID pandemic, people have resumed global travelling, which plays a major role in the spread of bedbugs, especially to tourism hotspots with high population density and highly urbanized conditions.

Many bedbug eradication methods have been devised; however, each have their own shortcomings. For example, chemical treatments using pesticides such as pyrethroids or desiccants have been common. However, chemical insecticides could be detrimental to human health upon prolonged exposure, leading to health risks including but not limited to respiratory issues and skin irritation. Also, while direct contact with the insecticide is needed to kill the bedbugs, the pesticides may fail to penetrate through the mattress to reach those hiding deep within, which could continue proliferating and cause recurring infestation. More alarmingly, recent studies have shown that some bedbugs are developing pesticide resistance, meaning that chemical treatment is rendered less and less effective in bedbug infestation control.

Special mattress encasements have also been developed to address the problem of bedbug infestation. However, encasements are merely a means to contain the bedbug within the mattress without actually eradicating them, and a means to prevent more bedbugs from infesting the mattress. Also, any damage and wear causing any openings for bedbugs to exit or enter would render the encasement ineffective.

Other treatments, including but not limited to UV irradiation, cryonite treatment or desiccant treatment are also devised, but they usually require professional application, and may come with other undesirable problems including health risks upon prolonged exposure or high cost, or may need large-scale time-consuming application which would require evacuation, adding to the inconvenience.

As multiple studies have pointed out that bedbugs cannot survive a temperature of over 45° C. (113° F.), steam heating with high temperature have also been employed as a bedbug eradication method. However, the humidity of the steam may damage the furniture nearby and promote bacterial growth.

Dry heating, therefore, is recognized as a highly effective bedbug eradication method. However, existing dry heating of mattresses typically involve the installation of bulky standalone heaters on the floor, requiring evacuation of the room for 6-8 hours of continuous heating, which proves to be highly energy-intensive and has low cost efficiency. Also, to ensure thorough heating of the mattress, repositioning of the multiple heaters is required, however the process of which is entirely manual and lacking a monitoring system to specifically pinpoint the most effective placements of the heaters.

In view of the above, there is a need to develop a more cost-effective and convenient, and less energy-consuming dry heating device for thorough heating of mattresses and eradication of bedbugs infesting within, with a monitoring system to optimize the heating process. The present invention addresses this need.

SUMMARY OF THE INVENTION

In one aspect of the present invention, a portable, remote-controllable dry-heating infestation control device is provided herewith for bedbug eradication on mattresses. The device comprises a steering chassis equipped with multiple self-cleaning wheels, a dry-heating compartment mounted with a fan unit and printed circuit board (PCB), an automatic control and feedback monitoring system connected to the dry-heating compartment, a circuit board housing and a detachable handle. Specifically, each of the multiple self-cleaning wheels is coated with a superhydrophobic material; and the dry-heating component comprises a ventilation compartment, a graphene-coated copper heater film and a servo motor-equipped automatic elevation system.

In one embodiment of the first aspect of the present invention, the graphene-coated copper heater film is fabricated by coating a copper film on a polyimide substrate using physical vapor deposition, and subjecting to laser scribing for patterning.

In another embodiment, the superhydrophobic material is selected from polytetrafluoroethylene, polydimethylsiloxane, wax-based coating, laser-induced aluminum, laser-induced graphene.

In other embodiment, the graphene-coated copper heater film has a thickness of less than 160 μm.

In a further embodiment, the sliding angle of the superhydrophobic material is less than 6°.

In yet another embodiment, the dry-heating compartment has a maximum output of 30° C.

In yet other embodiment, the automatic control and feedback monitoring system comprises an infrared sensor and a Proportional-Integral-Derivative (PID) control system.

In other embodiment, dry-heating infestation control device of the present invention further comprises a wireless Internet-of-Things (IoT) module connectable to a mobile application for remote control and real-time monitoring.

In a second aspect of the present invention, A method of pest eradication on a mattress using the portable, remote-controllable dry-heating infestation control device is provided herewith. Specifically, the method encompasses the eradication of bedbug eggs, bedbug nymphs, bedbug adults and ants.

In one embodiment of the second aspect of the present invention, the mortality rate of bedbug eggs, bedbug nymphs, bedbug adults and ants in a mattress of 0.5 mm thickness is at least 99% at under a heating temperature of 60° C. at an operational period of 30 seconds.

BRIEF DESCRIPTION OF DRAWINGS

The appended drawings, where like reference numerals refer to identical or functionally similar elements, contain FIG.s of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which:

FIG. 1A is a rendering and FIG. 1B is a schematic diagram of the exterior of the infestation control device respectively.

FIG. 5A provides a schematic diagram of the overall structure of the dry-heating compartment as connected to the automated elevation system; and FIG. 5B provides a schematic diagram with an emphasis on the structure and working principle of the copper heating film of the dry-heating compartment.

FIG. 7A is a schematic diagram, and FIG. 7B shows the simulation results of the air flow direction and heat transfer of the device.

DETAILED DESCRIPTION

As discussed above, one of the more highly recognized environmentally-friendly and safe bedbug eradication method is through dry heating up to a temperature lethal to bedbug survival, which is investigated to be 45° C. (113° F.) or above.

However, there is also a need for a more compact and intelligent dry heating system for bedbug eradication in mattresses, as an improvement to the existing systems which require installation of dry heaters which are large in size, require manual repositioning and lack in real-time monitoring to ensure thorough heat treatment of the infested mattress.

In view of the above, a novel the portable, remote-controllable dry-heating infestation control device for bedbug eradication is provided in the present invention.

Figure 4:
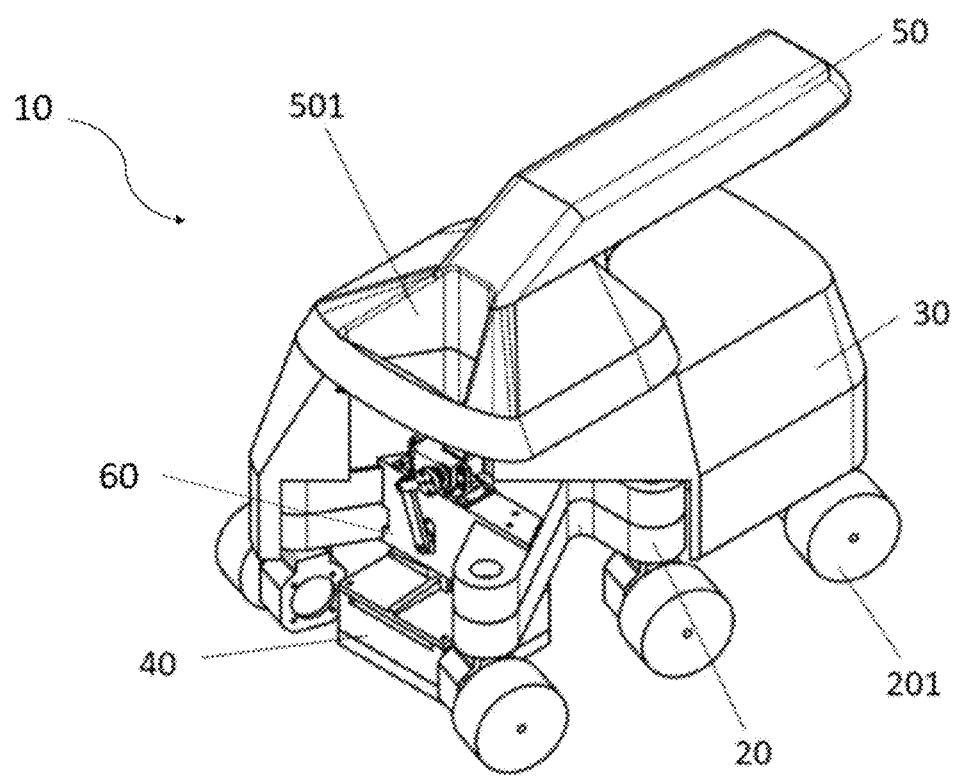
FIG. 4 shows the schematic diagram of the structures of a multi-wheeled embodiment of the infestation control device for bedbug eradication of the present invention.

The design of the portable, remote-controllable dry-heating infestation control device is illustrated schematically in FIG. 4, in which a multi-wheeled embodiment of the present invention is illustrated. Firstly, the device 10 has a steering chassis 20 which allows not only unidirectional movement, but is also designed for steering to optimize movement and efficient navigation and coverage of the entire mattress by the device 10.

It should be pointed out that the multiple wheels 201 installed to the chassis 20 are all coated with a superhydrophobic material to enable repelling of water and other liquids and preventing dirt, debris and contaminant accumulation on the wheel surfaces, hence granting the wheels self-cleaning properties and thereby maintaining optimal hygiene standards during the bedbug eradication operation of the device.

Figure 1A:
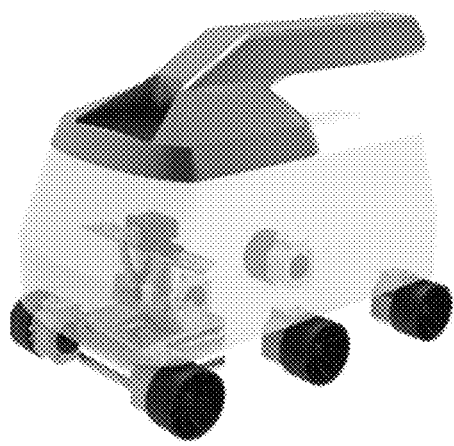
FIGS. 1A and 1B illustrates the external appearance of the portable, remote-controllable dry-heating infestation control device for bedbug eradication of the present invention.
Figure 1B:
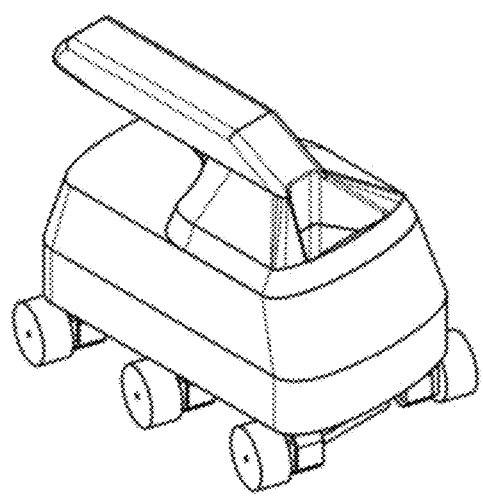
Figure 2:
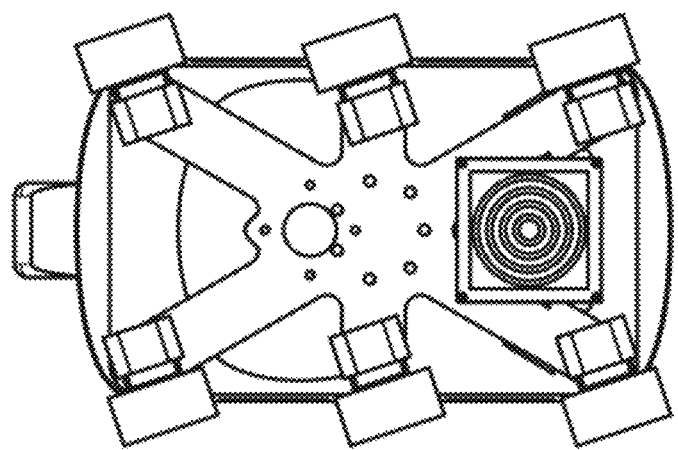
FIG. 2 provides a schematic illustration of the bottom of the infestation control device for bedbug eradication of the present invention.
Figure 3:
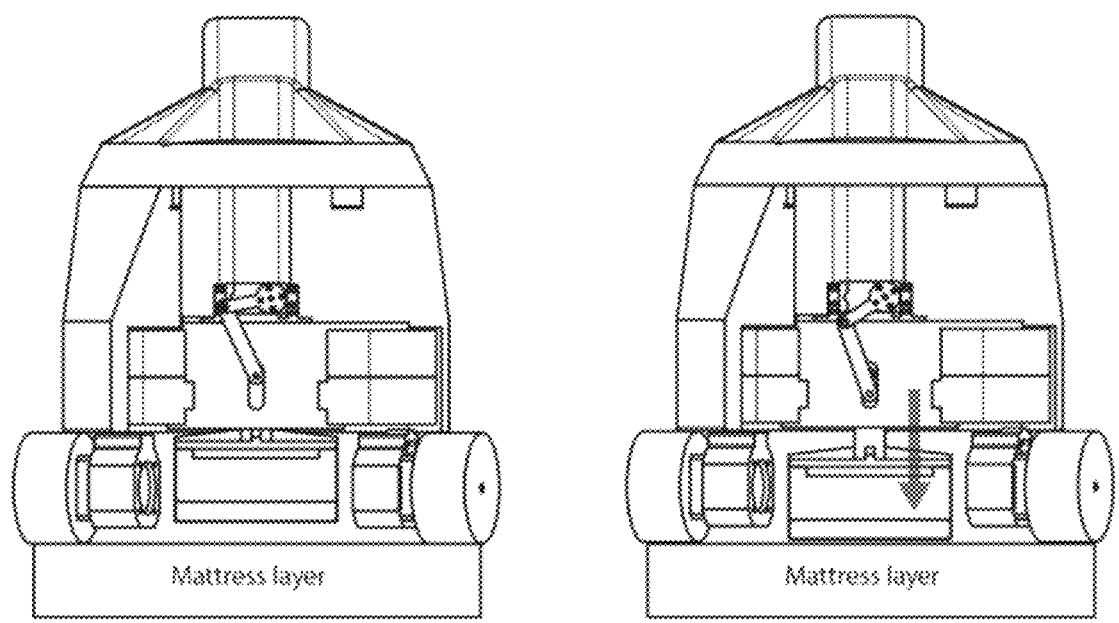
FIG. 3 shows the schematic diagrams of the standby and operating configurations of the infestation control device for bedbug eradication of the present invention.
Figure 5A:
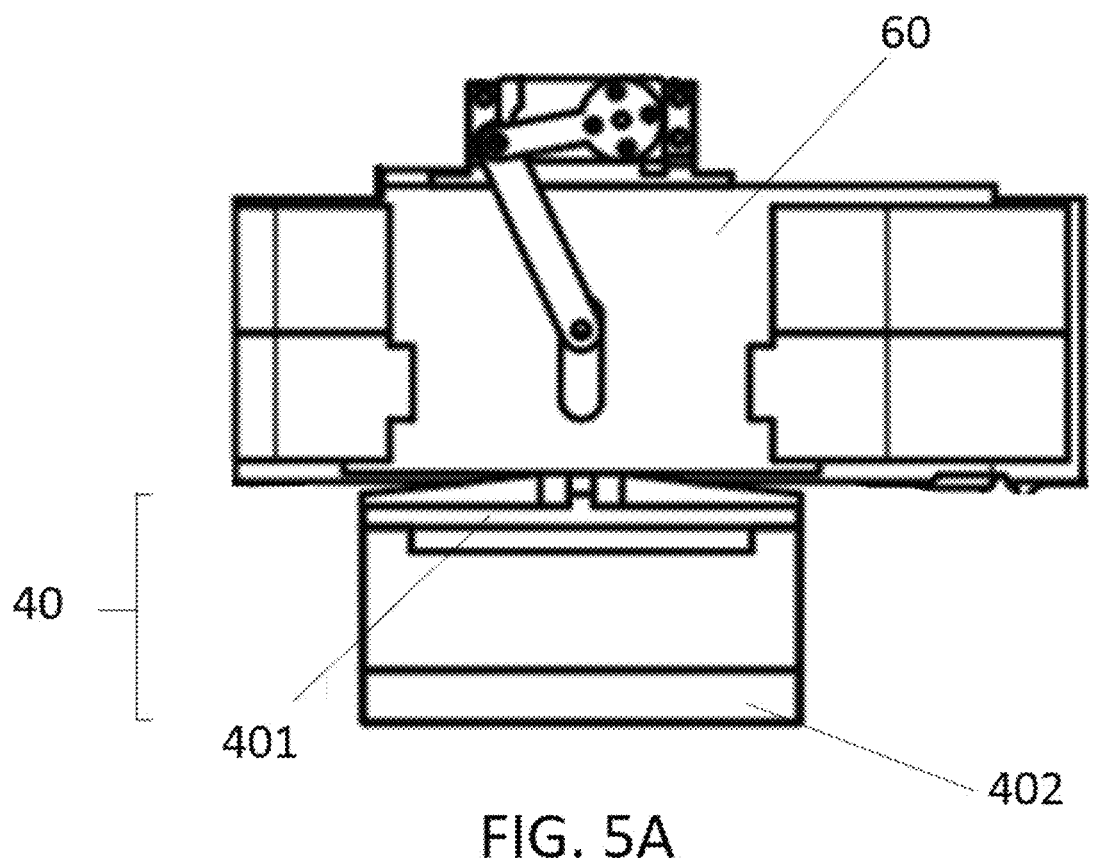
FIGS. 5A and 5B show structure and working mechanism of the dry-heating compartment of the infestation control device for bedbug eradication of the present invention.
Figure 5B:
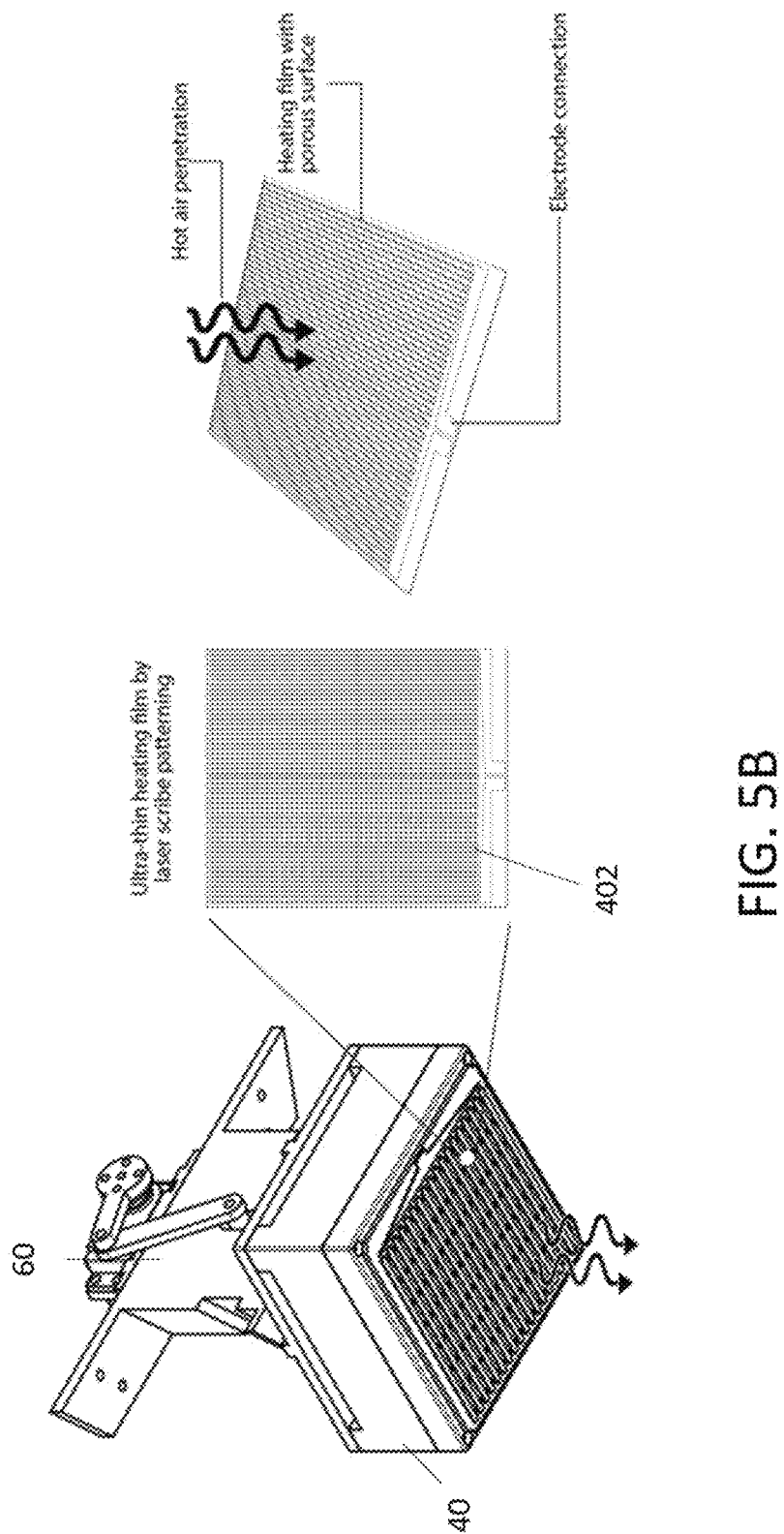
Figure 6:
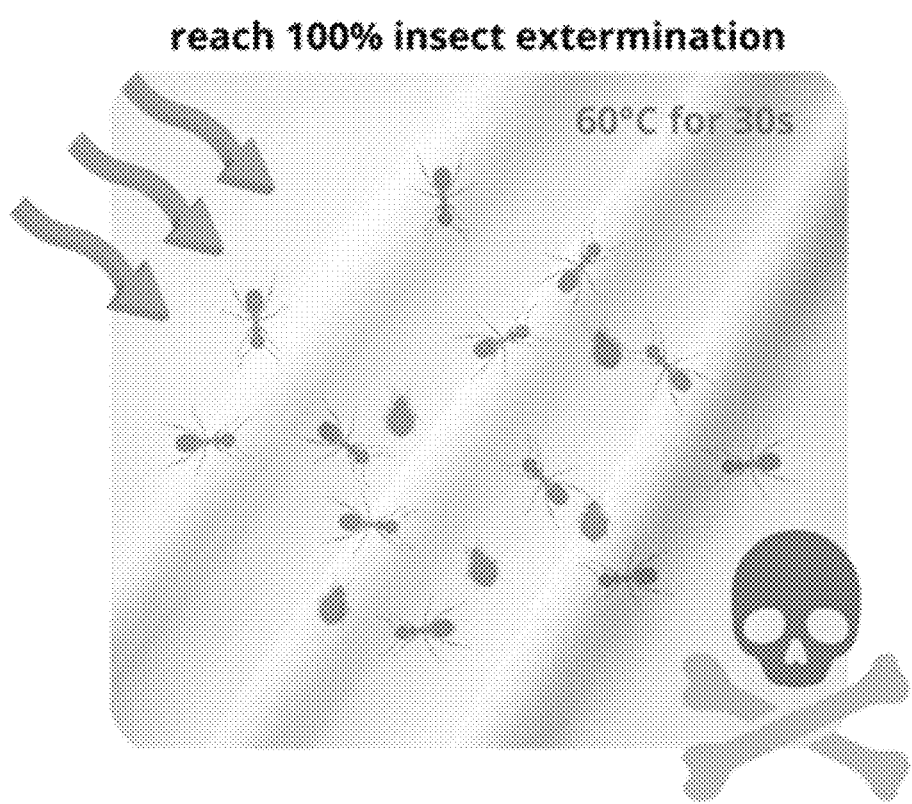
FIG. 6 is an illustration of the high efficiency of the infestation control device for bedbug eradication of the present invention, particularly against ants and bedbugs.

Referring to FIGS. 4, 5A and 5B, the dry-heating compartment 40 is connected to an automated elevation system 60 equipped with a servo motor to allow the compartment to be elevated and contracted towards the main body of the device in standby mode; and is lowered for dry heating of the mattress during operating mode (see FIG. 3).

The dry-heating compartment 40 further comprises an ultra-thin graphene-coated copper heating film 402, fabricated on a polyimide substrate and patterned through laser scribing to allow optimum heat conduction and heat convection through the hot air passing through it, which have heating capabilities of reaching a stable and constant temperature of 50-60° C. and a maximum heating temperature of 80° C. for a limited period of time. The heating process is further enhanced by the fan unit 401, which allows ventilation of the heated air to reach and penetrate the target infested area of the mattress.

The dry-heating compartment 40 is mounted to a compact PCB as a power outlet, and is further connected to a PID control mechanism and infrared sensor as an automatic control and feedback mechanism, which is capable of real-time measurement of temperatures and allowing instantaneous and automated responses and fine-tune adjustments to the operation of the device 40, including movement and temperature control, to ensure uniform and thorough heating of the mattress for bedbug eradication. These systems and circuit boards are compactly placed and protected in the circuit board casing 30 of the device.

A wireless Internet-of-Things (IoT) module is also installed within the device, which is connectable to a mobile application for remote control and real-time monitoring on demand. Through the use of the mobile application, the temperature and movement of the device can be controlled remotely according to the real-time temperature feedback from the infrared sensor, and adjustments to the dry-heating operation can be instantaneous made, without the need for professional pest control services.

A detachable handle 50 is also optionally installable for easy portability and maneuverability. Optionally, the device is also operable under manual control for greater flexibility in operation.

The detachable handle 50 further comprises a ventilation compartment 501, such that the hot air can be effectively guided and channeled to the targeted eradication area for more thorough heat penetration.

It should also be noted that, the steering chassis 20 can also be installed with, tracks with superhydrophobic coatings instead of multiple superhydrophobic self-cleaning wheels according to the needs. These different configurations enable autonomous navigation of the device through various sizes ranging from twin, full, queen or king-sized bed mattresses, or other bedding products.

EXAMPLES

An exemplary embodiment of the present invention is illustrated in FIG. 4, wherein the steering chassis 20 is attached with six wheels coated with superhydrophobic materials and possess self-cleaning properties.

For the dry-heating compartment 40, the ultra-thin copper heating film 401 in the exemplary embodiment is patterned to have a dense vertical serpentine pattern through laser scribing.

Specifically, the graphene-coated copper heating film in this embodiment is of a thickness of less than 160 μm.

Figure 7A:
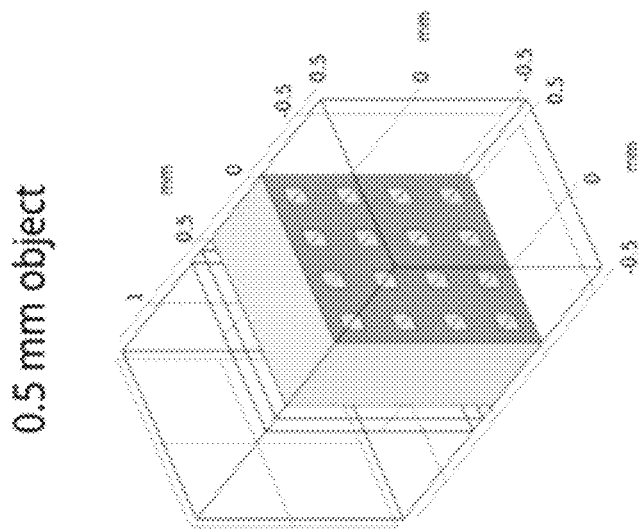
FIGS. 7A and 7B illustrate the air flow direction and heat transfer of the infestation control device for bedbug eradication of the present invention.
Figure 7A:
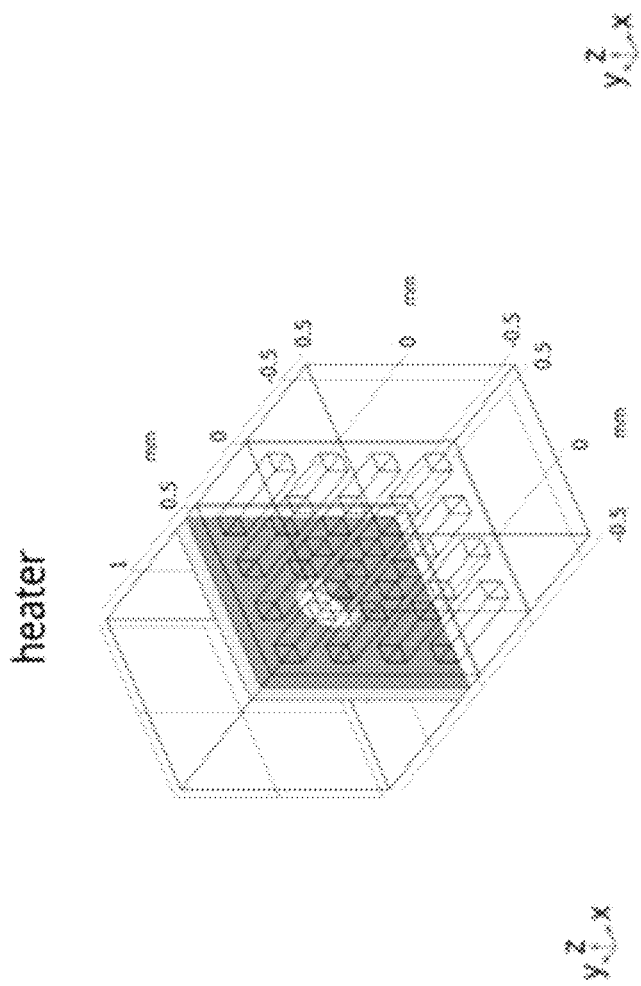
Figure 7B:
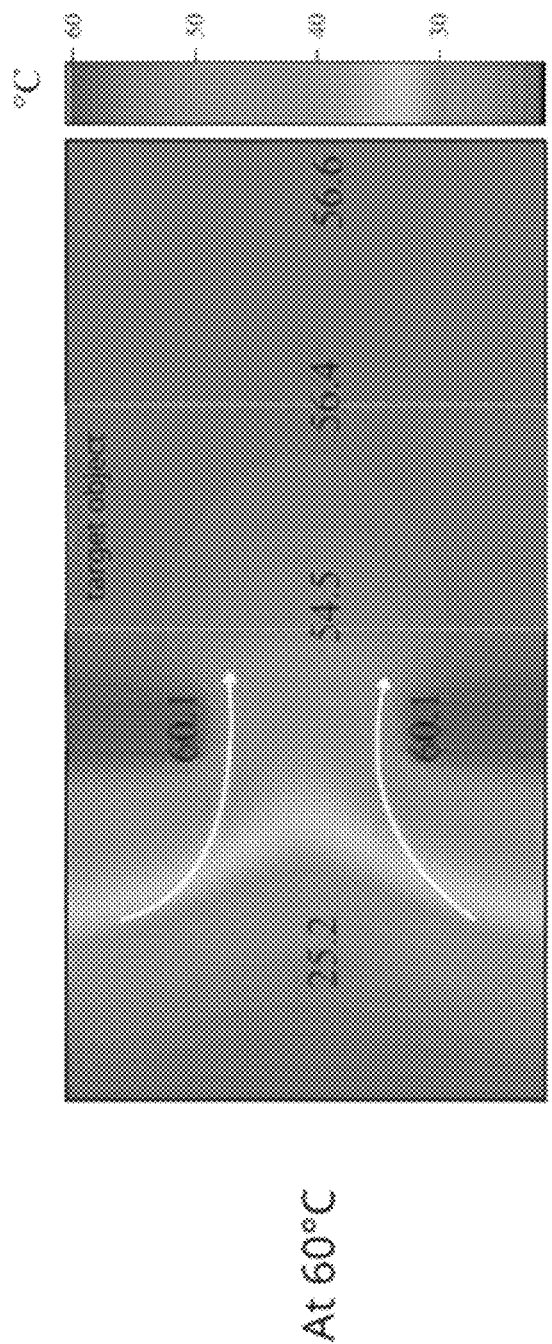
Figure 8:
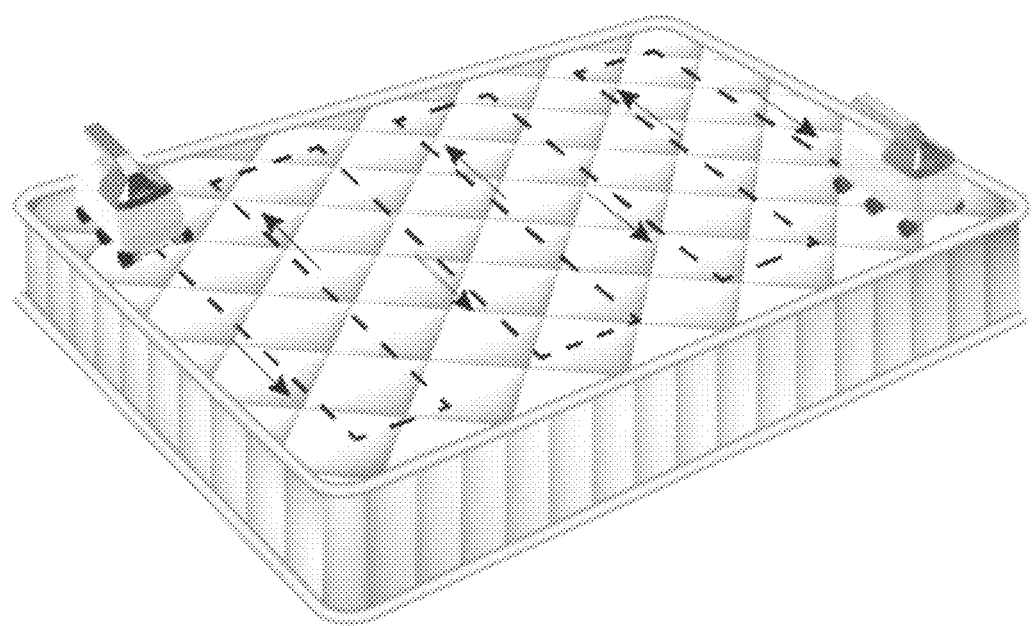
FIG. 8 provides a schematic diagram of the simulated operation procedure and movement of the infestation control device for bedbug eradication of the present invention on a mattress.

As observed in FIGS. 7A and 7B, this exemplary embodiment of the bedbug eradication device of the present invention is capable of uniformly heating up the target infested area of the mattress up to 60° C. within approximately 0.5 mm thickness.

Specifically, the exemplary embodiment of the device of the present invention is capable of not only eradicating bedbugs of different life stages (eggs, nymphs and adults), but it is also effective in eradicating ant infestations.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

The invention claimed is:

1. A portable, remote-controllable dry-heating infestation control device for bedbug eradication on mattresses, comprising:
   a steering chassis equipped with multiple self-cleaning wheels or tracks;
   a dry-heating compartment mounted with a printed circuit board (PCB);
   a servo motor-equipped automatic elevation system connected to the dry-heating compartment;
   an automatic control and feedback monitoring system connected to the dry-heating compartment;
   a circuit board housing; and
   a detachable handle;
   wherein each of the multiple self-cleaning wheels or tracks is coated with a superhydrophobic material; and
   wherein the dry-heating component comprises a fan unit, a graphene-coated copper heater film and a servo motor-equipped automatic elevation system.

2. The device of claim 1, wherein the graphene-coated copper heater film is fabricated by coating a copper film on a polyimide substrate using physical vapor deposition, and subjecting to laser scribing for patterning.

3. The device of claim 1, wherein the graphene-coated copper heater film has a thickness of less than 160 μm.

4. The device of claim 1, wherein the superhydrophobic material is selected from polytetrafluoroethylene, polydimethylsiloxane, wax-based coating, laser-induced aluminum or laser-induced graphene.

5. The device of claim 4, wherein the sliding angle of the superhydrophobic material is less than 6°.

6. The device of claim 1, wherein the dry-heating compartment has a maximum output of 330° C.

7. The device of claim 1, wherein the automatic control and feedback monitoring system comprises an infrared sensor and a Proportional-Integral-Derivative (PID) control system.

8. The device of claim 1, further comprising a wireless Internet-of-Things (IoT) module connectable to a mobile application for remote control and real-time monitoring.

9. A method of pest eradication on a mattress comprising: Utilizing the device of claim 1 to eradicate a pest; wherein the pest comprises at least bedbug eggs, bedbug nymphs, bedbug adults and ants.

10. The method of claim 9, wherein the mattress has a 0.5 mm thickness, and a mortality rate of bedbug eggs, bedbug nymphs, bedbug adults and ants in said mattress is at least 99% under a heating temperature of 60° C. at an operational period of 30 seconds.

\* \* \* \* \*